United States Patent Office 3,436,388
Patented Apr. 1, 1969

3,436,388
NOVEL 16-OXO-21-OIC ACID DISUBSTITUTED
AMIDES OF THE PREGNANE SERIES
John E. Pike, Kalamazoo, and William P. Schneider, Kalamazoo Township, Kalamazoo County, Mich., assignors to The Upjohn Company, Kalamazoo, Mich., a corporation of Delaware
No Drawing. Continuation-in-part of application Ser. No. 458,426, May 24, 1965. This application Sept. 30, 1966, Ser. No. 583,473
Int. Cl. C07c 173/10, 169/36
U.S. Cl. 260—239.5       15 Claims

ABSTRACT OF THE DISCLOSURE

The novel compounds of this invention have, in ring D the structure

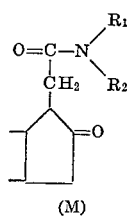

(M)

wherein $R_1$ and $R_2$ are each selected from the group consisting of (1) alkyl radicals containing from 1 to 12 carbon atoms, inclusive,
(2) cycloalkyl radicals containing from 5 to 6 carbon atoms, inclusive,
(3) aryl radicals,
(4) aralkyl radicals containing from 7 to 9 carbon atoms, inclusive,
(5) substituted alkyl radicals containing from 1 to 6 carbon atoms, inclusive, and $R_1$ and $R_2$ taken together are selected from the group consisting of (1) an alkylene chain containing from 2 to 5 carbon atoms, inclusive,
(2) an alkylene chain containing 4 carbon atoms interrupted by an oxygen atom, and
(3) an alkylene chain containing 4 carbon atoms interrupted by a nitrogen atom, and methods used in the preparation thereof.

This application is a continuation-in-part of application Ser. No. 458,426 filed May 24, 1965 and now abandoned.

This invention relates to novel 16-oxo-21-oic acid disubstituted amides of the pregnane series as will be described below, and to methods used in the preparation thereby.

*Brief description of the invention*

More particularly this invention relates to novel steroid 16-oxopregnan-21-oic acid disubstituted amides represented by the following formulae:

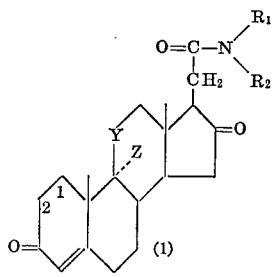

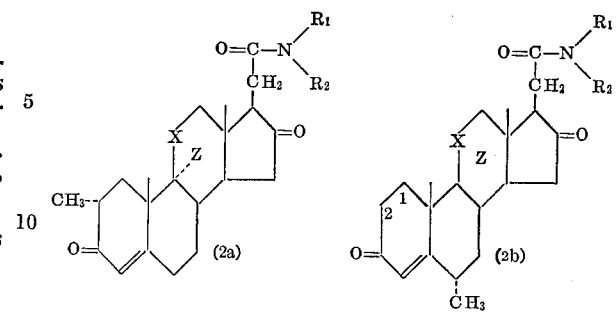

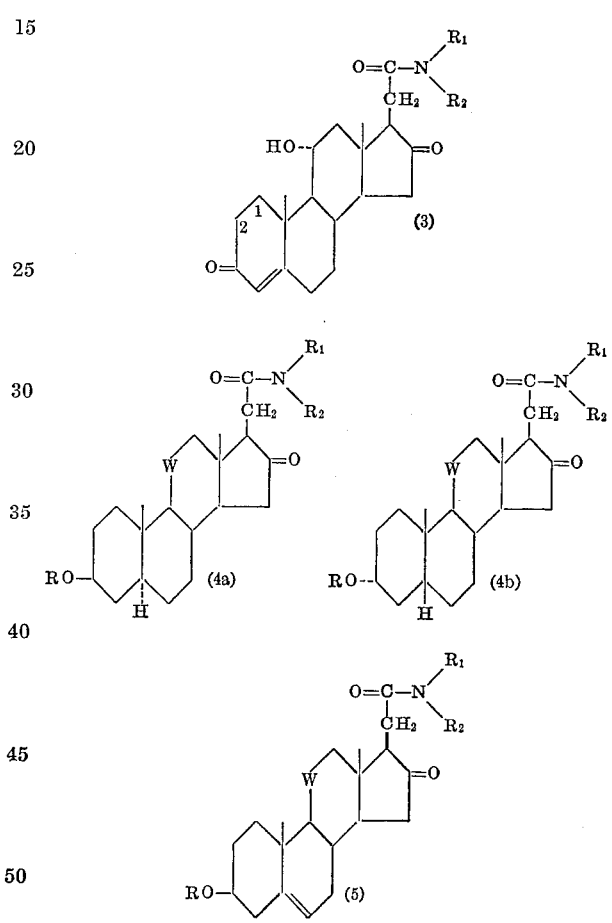

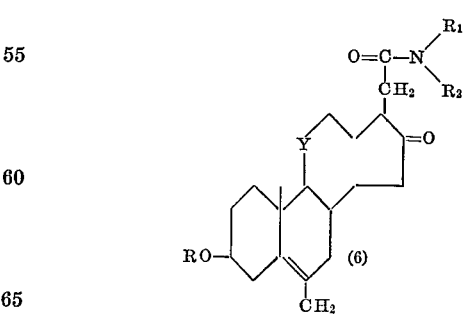

wherein the 1,2-carbon atom linkage is selected from the group consisting of single and double bond linkages, R is selected from the group consisting of hydrogen and the acyl radical of a hydrocarbon carboxylic acid containing from 1 to 12 carbon atoms, inclusive, W is selected from the group consisting of methylene (>CH$_2$), β-hydroxymethylene

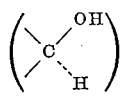

carbonyl (>C=O), α-hydroxymethylene

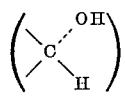

and α-acyloxymethylene

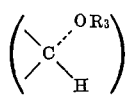

R$_3$ being the acyl radical of a hydrocarbon carboxylic acid containing from 1 to 12 carbon atoms, inclusive, and provided that R$_3$ is the same as R when R is an acyl radical, X is selected from the group consisting of β-hydroxymethylene

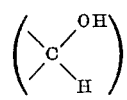

and carbonyl (>C=O), Y is selected from the group consisting of methylene (>CH$_2$), β-hydroxymethylene

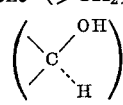

and carbonyl (>C=O), Z is selected from the group consisting of hydrogen and fluorine, X and Z and Y and Z can together constitute a 9(11)-double bond.

The novel compounds of Formula M and more particularly the compounds of Formulae 1, 2a, 2b, 3, 4a, 4b, 5 and 6 possess useful therapeutic properties, such as cardiotonic, anti-inflammatory, salt and water regulating, pituitary inhibiting, anti-anabolic, muscle relaxant, anti-fertility, cytotoxic, anti-viral, blood-pressure lowering, central nervous system regulating, serum cholesterol lowering, and anti-microbial activities.

The compounds of the formulae depicted above are useful in the treatment of diseases of animals and are particularly useful in the treatment of inflammatory conditions of mammals and birds, such as the treatment of inflammatory conditions of the skin, eyes and ears of valuable domestic animals, as well as contact dermatitis and other allergic reactions.

Additionally, the compounds of the formulas depicted above are useful in treating mental disease states and circulatory diseases in mammals and birds, and more particularly in valuable domestic animals. These compounds have digitalis-like activity in increasing the contractility of the heart muscle, diminishing the heart rate and improving cardiac efficiency. In addition, they possess the advantage of a greater margin of safety relative to digitalis and related drugs.

Administration of the compounds of Formulae M, 1, 2a, 2b, 3, 4a, 4b, 5 and 6 can be in conventional dosage forms, such as pills, tablets, capsules, syrups or elixirs for oral use, or in liquid forms which are suitable for injectable products. They can also be administered topically in the form of ointments, creams, lotions and the like, with or without coacting antibiotics, germicides or other materials forming advantageous combinations therewith.

The compounds of the formulae given above are also useful as ultraviolet screens. When used topically they absorb a portion of erythema producing ultraviolet bands and at the same time permit tanning ultraviolet bands to come through and are useful ultraviolet screening agents in the tanning of human skin.

The products of Example 1 show cytotoxicity in the anti-cancer KB cell tube dilution test. This test is described in Cancer Res. 19, 843 (1959). The significance of this in vitro cytotoxicity is discussed in Arch. Surg. 91, 376 (1965); Fed. Proc. 19, 142 (1960); Cancer Chemo. Repts. p. 157 (1961); Proc. Amer. Assoc. Cancer Res. 3, 265 (1961); Cancer Res. 21, 1042 (1961); Cancer 15, 284 (1962); Cancer Res. 21, 583 (1961); Proc. Amer. Assoc. Cancer Res. 3, 370 (1962); Dissemination of Cancer, Chpts. 10 and 11, 1961 (616.994 C68).

The novel compounds of Formula M and more particularly the compounds of Formulae 1, 2a, 2b, 3, 4a, 4b, 5 and 6 are produced according to the following reaction scheme:

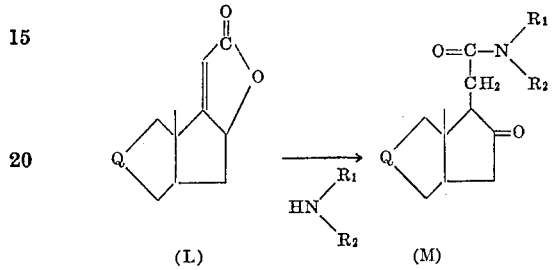

wherein Q is the remainder of the steroid moiety and R$_1$ and R$_2$ are defined as above.

The starting steroid compounds of Formula L, and more particularly the 16β-hydroxy-21-carboxylic acid γ-lactones of the pregnane series used as starting materials to produce the compounds of Formulae 1, 2a, 2b, 3, 4a, 4b, 5 and 6, are disclosed in U.S. Patent 3,162,631.

Representative of the secondary amines of the formula

which are reacted with the starting steroid are:

(a) Dialkylamines, such as dimethylamine, diethylamine, dibutylamine, diisoamylamine, dioctylamine, didodecylamine, methylethylamine, methylbutylamine, and the like, (b) Cycloalkylamines, such as dicyclohexylamine and dicyclopentylamine, and the like, (c) Diarylamines, such as diphenylamine, N-phenyl-2-naphthylamine, di-2-naphthylamine, and the like, (d) Substituted dialkylamines, such as 2,2'-dichlorodiethylamine, diethanolamine, and the like (e) Alkylcycloalkylamines, such as N-methylcyclooctylamine, N-methylcyclohexylamine, and the like, (f) Arylalkylamines, such as N-methylaniline, N-methyltoluidine, and the like, (g) Aralkylalkylamines, such as N-methylbenzylamine, N-ethylbenzylamine, and the like, (h) Diaralkylamines, such as dibenzylamine, diphenethylamine and the like, and (i) Cyclic amines, such as piperidine, pyrrolidine, tetrahydroquinoline, oxazolidine, morpholine, indoline, ethyleneamine, N-methylpiperazine, piperazine, and the like.

The process of the present invention comprises reacting the 16β-hydroxy-21-carboxylic acid γ-lactone of Formula L, such as 3β,16β-dihydroxy - 11 - oxo - 5α - pregn-17(20)-en-21-oic acid γ-lactone, with a secondary amine of the farmula

R$_1$ and R$_2$ being defined as above, such as piperazine, to obtain the compounds of Formula M, such as 3β-hydroxy-11,16 - dioxo - 5α - pregnan - 21 - oic acid piperazide. Advantageously the reaction is carried out at a temperature of from about 0° C. to 100° C., with a temperature of 10° C. to 25° C. being preferred, in an organic solvent. Suitable organic solvents are ethanol, tetrahydrofuran, dioxane, methanol, dimethyl ether, benzene, with ethanol being preferred.

The compounds of Formula M are recovered following the reaction by removal of the solvent, fractional crystallization, chromatography of the total crude alkaline hydrolysis reaction product on acid-washed alumina, Florisil (synthetic magnesium silicate), silica-gel, or silicic acid, eluting with chloroform containing increasing amounts of methanol or hexanes containing increasing amounts of acetone, Craig countercurrent partition separation, column partition chromatography, preparative paper chromatography, or a combination of these.

The compounds of Formula M containing acylatable hydroxyl groups can be acylated according to procedures known in the art, for example, those disclosed in U.S. Patent 2,877,241. Suitable acylating agents are organic carboxylic acids, particularly hydrocarbon carboxylic acids, containing from 1 to 12 carbon atoms, inclusive, or the anhydrides or acid halides thereof, for example, a saturated straight-chain aliphatic acid, e.g., formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., β-cyclopentylpropionic, cyclohexanecarboxylic, cyclohexylacetic, an alkaryl acid, e.g., benzoic, phenylacetic, β-phenylpropionic, o-, m-, p-toluic, a saturated dibasic acid (which can be converted into water-soluble, e.g., sodium, salts), e.g., succinic, adipic, a monobasic unsaturated acid, e.g., acrylic, crotonic, undecylenic, propiolic, undecolic, cinnamic, dibasic unsaturated acids (which can be converted into water-soluble, e.g., sodium, salts), e.g., maleic and citraconic, or the acid anhydrides and acid halides thereof. The acylation is carried out using the acylating agent as solvent, or in the presence of a suitable inert solvent, such as benzene, xylene, dioxane, methylene chloride or the like, particularly when the acylating agent is a solid, and frequently in the presence of a catalyst, such as p-toluenesulfonic acid, or an amine, preferably pyridine. Completion of the reaction can take from a few minutes to 24 hours, depending on the temperature and the solvent employed.

If the acylating agent is the free acid, the reaction is preferably carried out in the presence of an esterification catalyst, for example, p-toluenesulfonyl chloride, trifluoroacetic anhydride, p-toluenesulfonic acid, trifluoroacetic acid, sulfuric acid, and the like.

Thus, for examle, 3β-hydroxy-11,16-dioxo-5α-pregnan-21-oic acid piperazide is reacted with acetic anhydride to obtain 3β-acetoxy-11,16-dioxo-5α-pregnan-21-oic acid piperazide.

The novel 16-oxo-21-oic disubstituted amides, the compounds of Formula M and particularly the compounds of Formulae 1, 2a, 2b, 3, 4a, 4b, 5 and 6 possess the significant advantage of being more water-soluble than other groups of steroids and are particularly more water soluble than the 16β-hydroxy 21-carboxylic acid γ-lactones from which they are prepared.

The following examples illustrate the best mode contemplated by the inventors for carrying out this invention, but are not to be construed as limiting the scope thereof.

EXAMPLE 1

3β-hydroxy-11,16-dioxo-5α-pregnan-21-oic acid piperazide 0.875 g. of piperazine was added to a solution of 0.25 g. of 3β,16β-dihydroxy-11-keto-5α-pregnan-21-oic acid γ-lactone in 250 ml. of ethanol. The reaction mixture was stirred at room temperature for 45 minutes and then the ethanol was removed in vacuo. The residue was dissolved in methylene chloride, washed with water and dried over sodium sulfate. Removal of the solvent and crystallization of the residue from acetone-commercial hexanes yielded 3β-hydroxy-11,16-dioxo-5α-pregnan-21-oic acid piperazide having a melting point of 205° to 209° C., infrared absorption bands $1\nu_{max.}^{Nujol}$) at 3400, 3080, 2740, 3260, 1750, 1700, 1635, 1250, )185, 1135, 1120, 1070, 1055, 1035 cm.$^{-1}$ and the following analysis:

Analysis.—Calcd. for $C_{25}H_{38}N_2O_4$: C, 69.73; H, 8.90; N, 6.51; O, 14.86. Found: C, 69.39; H, 8.13; N, 6.29; O, 15.19.

In like manner substituting other secondary amines for piperazine there is obtained the corresponding disubstituted amide of 3β-hydroxy-11,16-dioxo-5α-pregnan-21-oic acid, such as the dimethylamide, dibenzylamide, diethanolamide, morpholine amide, and piperidine amide.

Similarly, substituting other 16β-hydroxy-21-carboxylic acid γ-lactones of the pregnane series disclosed in U.S. Patent 3,162,631 [and particularly the compounds of Formulae 1, 2a, 2b, 3, 4a, 4b, 6 and 7a of said patent] for 3β,16β - dihydroxy - 11 - keto-5α-pregnan-21-oic acid γ-lactone, is productive of their corresponding piperazides and other disubstituted amides represented by the structural Formulae 1, 2a, 2b, 3, 4a, 4b, 5 and 6.

EXAMPLE 2

3β-acetoxy-11,16-dioxo-5α-pregnan-21-oic acid piperazide

A mixture of the 3β-hydroxy-11,16-dioxo-5α-pregnan-21-oic acid piperazide, 2 ml. of acetic anhydride and 100 ml. of piperidine is stirred and allowed to stand at room temperature for approximately 18 hours. The reaction mixture is then poured into ice water and the crystalline material which forms is removed by filtration, washed with water and dried in vacuo to yield 3β-acetoxy-11,16-dioxo-5α-pregnan-21-oic acid piperazide.

In like manner substituting other pregnanoic acid piperazides and disubstituted amides, obtained according to Example 1 for 3β-hydroxy-11,16-dioxo-5α-pregnan-21-oic acid piperazide there is obtained the corresponding 3-acetylated piperazides and 3-acetylated disubstituted amides otherwise corresponding to the products of Example 1.

We claim:

1. A compound of the formula

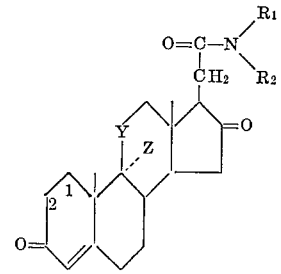

wherein the 1,2-carbon atoms linkage is selected from the group consisting of single and double bond linkages; Y is selected from the group consisting of methylene (>CH$_2$), β-hydroxymethylene

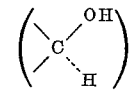

and carbonyl (>C=O); Z is selected from the group consisting of hydrogen and fluorine; and Y and Z can together constitute a 9(11)-double bond; and R$_1$ and R$_2$ are each selected from the group consisting of (1) alkyl radicals containing from 1 to 12 carbon atoms, inclusive, (2) cycloalkyl radicals containing from 5 to 6 carbon atoms, inclusive, (3) aryl radicals, (4) aralkyl radicals containing from 7 to 9 carbon atoms, inclusive, (5) substituted alkyl radicals containing from 1 to 6 carbon atoms, inclusive, and R$_1$ and R$_2$ taken together are selected from the group consisting of (1) an alkylene chain containing from 2 to 5 carbon atoms, inclusive,
(2) an alkylene chain containing 4 carbon atoms interrupted by an oxygen atom, and
(3) an alkylene chain containing 4 carbon atoms interrupted by a nitrogen atom.

2. A compound selected from the group consisting of compounds of the following formulae:

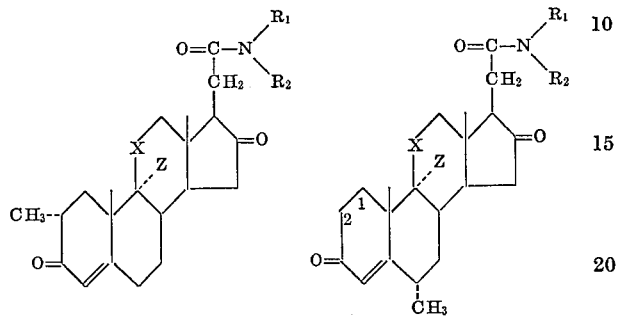

wherein the 1,2-carbon atoms linkage is selected from the group consisting of single and double bond linkages; X is selected from the group consisting of β-hydroxymethylene $$\left(\begin{array}{c}\diagdown\\ \diagup\end{array} C\begin{array}{c}\cdot\cdot OH\\ \diagdown H\end{array}\right)$$

and carbonyl; Z is selected from the group consisting of hydrogen and fluorine; and X and Z can together constitute a 9(11)-double bond; and $R_1$ and $R_2$ are each selected from the group consisting of
(1) alkyl radicals containing from 1 to 12 carbon atoms, inclusive,
(2) cycloalkyl radicals containing from 5 to 6 carbon atoms, inclusive,
(3) aryl radicals,
(4) aralkyl radicals containing from 7 to 9 carbon atoms, inclusive,
(5) substituted alkyl radicals containing from 1 to 6 carbon atoms, inclusive, and $R_1$ and $R_2$ taken together are selected from the group consisting of
(1) an alkylene chain containing from 2 to 5 carbon atoms, inclusive,
(2) an alkylene chain containing 4 carbon atoms interrupted by an oxygen atom, and
(3) an alkylene chain containing 4 carbon atoms interrupted by a nitrogen atom.

3. A compound of the formula:

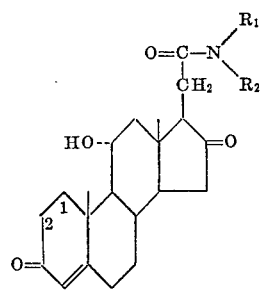

wherein the 1,2-carbon atoms linkage is selected from the group consisting of single and double bond linkages; and $R_1$ and $R_2$ are each selected from the group consisting of
(1) alkyl radicals containing from 1 to 12 carbon atoms, inclusive,
(2) cycloalkyl radicals containing from 5 to 6 carbon atoms, inclusive,
(3) aryl radicals,
(4) aralkyl radicals containing from 7 to 9 carbon atoms, inclusive,
(5) substituted alkyl radicals containing from 1 to 6 carbon atoms, inclusive, and $R_1$ and $R_2$ taken together are selected from the group consisting of
(1) an alkylene chain containing from 2 to 5 carbon atoms, inclusive,
(2) an alkylene chain containing 4 carbon atoms interrupted by an oxygen atom, and
(3) an alkylene chain containing 4 carbon atoms interrupted by a nitrogen atom.

4. A compound selected from the group consisting of the following formulae:

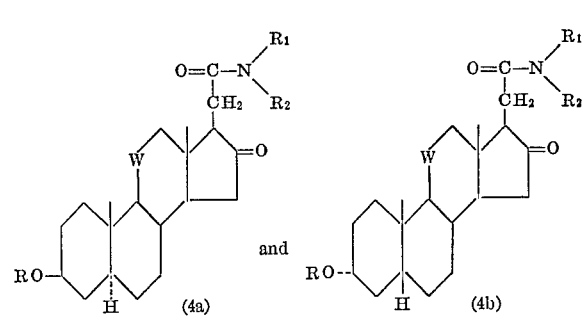

wherein R is selected from the group consisting of hydrogen and the acyl radical of a hydrocarbon carboxylic acid containing from 1 to 12 carbon atoms, inclusive, and W is selected from the group consisting of methylene ($>CH_2$), β-hydroxymethylene

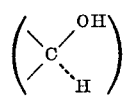

carbonyl ($>C=O$), and α-hydroxymethylene

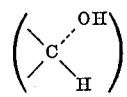

and α-acyloxymethylene

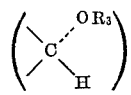

$R_3$ being the acyl radical of a hydrocarbon carboxylic acid containing from 1 to 12 carbon atoms, inclusive, provided that $R_3$ is the same as R when R is an acyl radical; and $R_1$ and $R_2$ are each selected from the group consisting of
(1) alkyl radicals containing from 1 to 12 carbon atoms, inclusive,
(2) cycloalkyl radicals containing from 5 to 6 carbon atoms, inclusive,
(3) aryl radicals,
(4) aralkyl radicals containing from 7 to 9 carbon atoms, inclusive,
(5) substituted alkyl radicals containing from 1 to 6 carbon atoms, inclusive, and $R_1$ and $R_2$ taken together are selected from the group consisting of
(1) an alkylene chain containing from 2 to 5 carbon atoms, inclusive,
(2) an alkylene chain containing 4 carbon atoms interrupted by an oxygen atom, and
(3) an alkylene chain containing 4 carbon atoms interrupted by a nitrogen atom.

5. A compound of the formula:

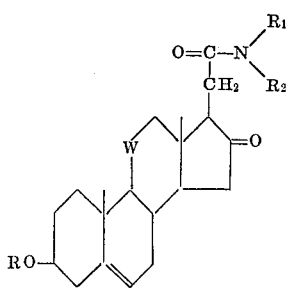

wherein R is selected from the group consisting of hydrogen and the acyl radical of a hydrocarbon carboxylic acid containing from 1 to 12 carbon atoms, inclusive, and W is selected from the group consisting of methylene (>CH₂), β-hydroxymethylene

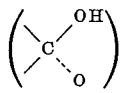

carbonyl (>C=O), and α-hydroxymethylene

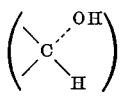

and α-acyloxymethylene

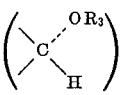

R₃ being the acyl radical of a hydrocarbon carboxylic acid containing from 1 to 12 carbon atoms, inclusive, provided that R₃ is the same as R when R is an acyl radical; and R₁ and R₂ are each selected from the group consisting of
  (1) alkyl radicals containing from 1 to 12 carbon atoms, inclusive,
  (2) cycloalkyl radicals containing from 5 to 6 carbon atoms, inclusive,
  (3) aryl radicals,
  (4) aralkyl radicals containing from 7 to 9 carbon atoms, inclusive,
  (5) substituted alkyl radicals containing from 1 to 6 carbon atoms, inclusive, and
R₁ and R₂ taken together are selected from the group consisting of
  (1) an alkylene chain containing from 2 to 5 carbon atoms, inclusive,
  (2) an alkylene chain containing 4 carbon atoms interrupted by an oxygen atom, and
  (3) an alkylene chain containing 4 carbon atoms interrupted by a nitrogen atom.

6. A compound of the formula:

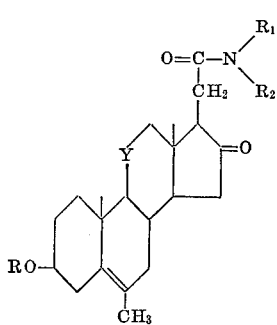

wherein R is selected from the group consisting of hydrogen and the acyl radical of a hydrocarbon carboxylic acid containing from 1 to 12 carbon atoms, inclusive, Y is selected from the group consisting of methylene (>CH₂), β-hydroxymethylene

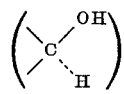

and carbonyl (>C=O); and R₁ and R₂ are each selected from the group consisting of
  (1) alkyl radicals containing from 1 to 12 carbon atoms, inclusive,
  (2) cycloalkyl radicals containing from 5 to 6 carbon atoms, inclusive,
  (3) aryl radicals,
  (4) aralkyl radicals containing from 7 to 9 carbon atoms, inclusive,
  (5) substituted alkyl radicals containing from 1 to 6 carbon atoms, inclusive, and
R₁ and R₂ taken together are selected from the group consisting of
  (1) an alkylene chain containing from 2 to 5 carbon atoms, inclusive,
  (2) an alkylene chain containing 4 carbon atoms interrupted by an oxygen atom, and
  (3) an alkylene chain containing 4 carbon atoms interrupted by a nitrogen atom.

7. A compound in accordance with claim 4, namely, 3β-hydroxy-11,16-dioxo-5α-pregnan-21-oic acid piperazide.

8. A compound in accordance with claim 1, namely, 3,11,16-trioxo-pregn-4-en-21-oic acid piperazide, 9. A compound in accordance with claim 1, namely, 3,11,16-trioxo-pregna-1,4-dien-21-oic acid piperazide.

10. A compound in accordance with claim 4, namely, 3β-acetoxy-11,16-dioxo-5α-pregnan-21-oic acid piperazide.

11. A compound in accordance with claim 4, namely, 3β-hydroxy-11,16-dioxo-5α-pregnan-21-oic acid morpholide.

12. A compound in accordance with claim 4, namely, 3β-hydroxy-11,16-dioxo-5α-pregnan-21-oic acid piperidide.

13. A compound in accordance with claim 1, namely, 3,11,16-trioxo-pregna-1,4-dien-21-oic acid morpholide.

14. A compound in accordance with claim 4, namely, 3,11,16-trioxo-pregn-4-en-21-oic acid piperidide.

15. Process for the production of 16-oxo-21-oic acid disubstituted amides of the pregnane series having in ring D the structure

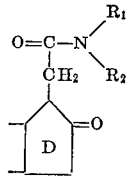

wherein R₁ and R₂ are each selected from the group consisting of
  (1) alkyl radicals containing from 1 to 12 carbon atoms, inclusive,
  (2) cycloalkyl radicals containing from 5 to 6 carbon atoms, inclusive,
  (3) aryl radicals,
  (4) aralkyl radicals containing from 7 to 9 carbon atoms, inclusive,
  (5) substituted alkyl radicals containing from 1 to 6 carbon atoms, inclusive, and
R₁ and R₂ taken together are selected from the group consisting of
  (1) an alkylene chain containing 2 to 5 carbon atoms, inclusive,
  (2) an alkylene chain containing 4 carbon atoms interrupted by an oxygen atom, and
  (3) an alkylene chain containing 4 carbon atoms interrupted by a nitrogen atom,
which comprises reacting a 16β-hydroxy-21-carboxylic acid γ-lactone of the pregnane series having in ring D the structure
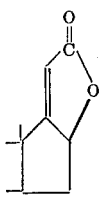
with a secondary amine.
No references cited.
HENRY A. FRENCH, *Primary Examiner.*
U.S. Cl. X.R.
260—239.55, 397.3, 397.4, 397.47, 999